Patented Nov. 10, 1942

2,301,252

UNITED STATES PATENT OFFICE 2,301,252

STABILIZED ROSIN SIZE COMPOSITION

Jack T. Cassaday, Stamford, Conn., assignor to American Cyanamid Company, New York, N. Y., a corporation of Maine No Drawing. Application December 28, 1940
Serial No. 372,173

3 Claims. (Cl. 106—218)

This invention relates to an improved rosin size and more particularly to a dry rosin size stabilized against oxidation.

Dry rosin sizes may be prepared by spray-drying or drum drying an aqueous dispersion of saponified rosin. Another method comprises the steps of reacting molten rosin and a concentrated alkali solution and allowing the reacted material to cool to form a solid mass which may later be broken up and ground to any desired size. Since these dry sizes consist principally of saponified abietic acid they are readily dispersed in water when required for use. Varying amounts of unsaponified rosin acids may be present without unduly impairing the dispersibility of the size. Some dry rosin sizes may contain as much as 50% unsaponified rosin. Gum or wood rosins or mixtures thereof are commonly employed in preparing these sizes.

The dry rosin sizes possess a number of distinct advantages but are subject to oxidation upon storage. In some cases, especially with the spray-dried product, the rate of oxidation is so rapid that the considerable heat developed constitutes a serious fire hazard. The dry rosin sizes also tend to darken in color during storage because of oxidation. It is also found that an insoluble material is formed in the rosin size upon prolonged storage which must be removed from the aqueous size dispersion or there is great danger that specks will be formed in the paper and the machine wire will be gummed up.

I have also found that the tendency of the rosin size dispersion to foam is closely associated with the degree of oxidation of the rosin size. A freshly prepared dry rosin size when made into an aqueous size dispersion of about 0.5% concentration exhibited a foaming index of only about 17. After six weeks storage of the dry rosin size in contact with air a size dispersion prepared therefrom had a foaming index of 49. In accelerated oxidizing tests the foaming index rose to as high as 80. When it is considered that a size dispersion having a foaming index of more than about 25 may cause foaming troubles in the paper making process it will be readily seen that the influence of oxidation on the rosin size is a serious problem.

I have now found that small amounts of alkyl-aryl secondary amines such as methyl aniline when added to the dry rosin size prevents almost completely the oxidation of the size. Methyl aniline is my preferred antioxidant material, although ethyl aniline, propyl aniline and other lower alkyl substituted anilines may be employed in lieu thereof. These antioxidants have the general formula.

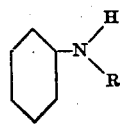

in which R is a lower alkyl radical having not more than 3 carbon atoms.

The antioxidant is preferably added to the rosin size during its manufacture, generally after the abietic acid has been saponified with alkali and while the material is still fluid. In some cases, however, the antioxidant may be added to the rosin before saponification. The amount of methyl aniline added to the rosin size is usually on the order of 1% based on the rosin content of the size. Small amounts, say 0.2%, or larger amounts up to about 3% may be used under different circumstances. As would be expected the smaller amounts will not prevent oxidation as completely and over as great a period of time as will larger amounts. The upper limit is governed principally by economic considerations.

The effectiveness of methyl aniline as an antioxidant for dry rosin size is illustrated by the results of a comparative test in which a dry rosin size having an initial foaming index of 17 was used. A sample of the dry rosin size when subjected to an accelerated oxidation test showed at the end of the period a foaming index of 61, whereas a sample of the same dry rosin under identical conditions except that it contained 1% of methyl aniline, based on the total rosin content, exhibited at the end of the test a foaming index of only 22. Since the foaming index of the stabilized rosin size is safely below the levels found tolerable in paper making operations the size may be regarded as completely stabilized against oxidation conditions generally met.

It is also found that when using my antioxidant the color of the rosin size is not initially darkened as is the case when using certain other antioxidant materials and the color of the size does not darken even upon prolonged storage. Moreover, the elimination of internal heat that accompanies auto-oxidation is an important factor in overcoming fire hazard during storage of my stabilized rosin sizes.

The foaming index mentioned above is a measure of the foaming tendency of the size dispersion under paper mill conditions. 180 cc. of water, 20 cc. of a 5% dispersion of the size to be tested and 5 cc. of a 10% alum solution are mixed vigorously for exactly 1 minute with a Hamilton Beech type mixer and then the solution is immediately poured into a 500 cc. graduate. The total volume of liquid and foam is measured and the foaming index is calculated as the ratio of increased volume to the total original volume expressed on a percentage basis. It has been found that the foaming index, as measured by this test, is a good basis for predicting the results obtainable with a rosin size when used in a paper mill.

What I claim is:

1. A dry wood rosin size stabilized against oxidation by the incorporation therein of stabilizing amounts of an alkyl-aryl secondary amine of the general formula

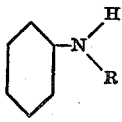

in which R is an alkyl group of not more than 3 carbon atoms.

2. A dry wood rosin size stabilized against oxidation by the incorporation therein of 0.2%–3.0% of methyl aniline based on the total rosin content.

3. A process of stabilizing dry wood rosin size against oxidation which comprises adding thereto 0.2%–3.0% of methyl aniline based on the total rosin content.

JACK T. CASSADAY.